United States Patent [19]

Orkin et al.

[11] Patent Number: 4,704,918

[45] Date of Patent: Nov. 10, 1987

[54] COMPOSITE MATERIAL FORCE OR MOTION TRANSMITTING MEMBER

[75] Inventors: Stanley S. Orkin, Vernon; Craig L. Carlson, Granby, both of Conn.

[73] Assignee: Kamatics Corporation, Bloomfield, Conn.

[21] Appl. No.: 702,420

[22] Filed: Feb. 19, 1985

[51] Int. Cl.[4] .............................................. F16C 3/00
[52] U.S. Cl. ................................ 74/579. R; 403/224; 464/181; 464/183
[58] Field of Search .......................... 74/579. R, 593; 403/224; 464/181, 183

[56] References Cited

U.S. PATENT DOCUMENTS

| | | | |
|---|---|---|---|
| 2,202,909 | 6/1940 | Hufferd et al. | 74/579. R |
| 2,534,791 | 12/1950 | Moyer | 74/579. R |
| 3,342,041 | 9/1967 | Nebiker, Jr. | 403/224 X |
| 3,475,988 | 11/1969 | Ditlinger et al. | 74/579. R |
| 3,553,978 | 1/1971 | Williams | 464/181 |
| 4,183,261 | 1/1980 | Eiselbrecher et al. | 74/579. R |
| 4,185,472 | 1/1980 | Yates et al. | 464/181 |
| 4,248,062 | 2/1981 | McLain et al. | 464/181 |
| 4,292,368 | 9/1981 | Mialon | 74/579. R X |
| 4,353,267 | 10/1982 | Robert | 74/579. R |
| 4,362,521 | 12/1982 | Puck et al. | 464/181 |
| 4,380,443 | 4/1983 | Federmann et al. | 464/181 |

Primary Examiner—Alan Cohan
Assistant Examiner—John A. Rivell
Attorney, Agent, or Firm—McCormick, Paulding & Huber

[57] ABSTRACT

A light-weight push, pull and/or torsion rod includes a light-weight core, fittings on either end, pins protruding from the outer surface of each fitting, and a tubular strength member surrounding the core and overlapping much of the end fitting. The strength member includes a fibrous braided layer which overlaps and closely captures the protruding tips of the pins to anchor the strength member to the end fitting. In one embodiment, the end fittings are conically tapered from the side adjacent the core and flare out from the narrow end of the cone, and the braid is woven tightly around the conical portion and flared portion of each end fitting so that the strength member abuts or bears against the end fitting when the rod is exposed to tension or compression forces. In another embodiment each end fitting is of substantially a straight cylindrical shape and the interengagement between the pins and the strength member is relied on more heavily for the transference of tension and compression forces between the end fittings and the strength member.

6 Claims, 8 Drawing Figures

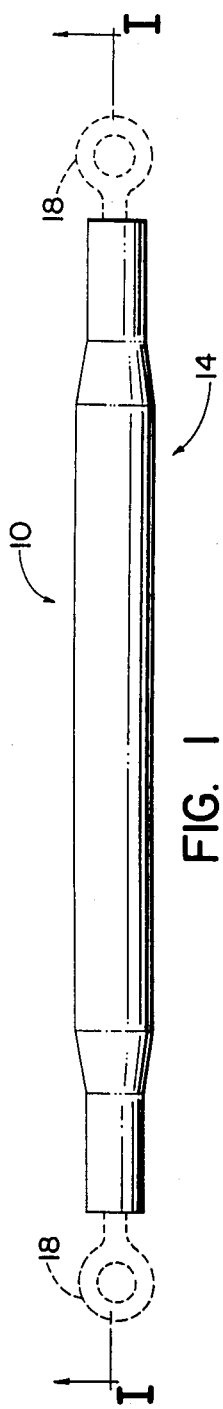
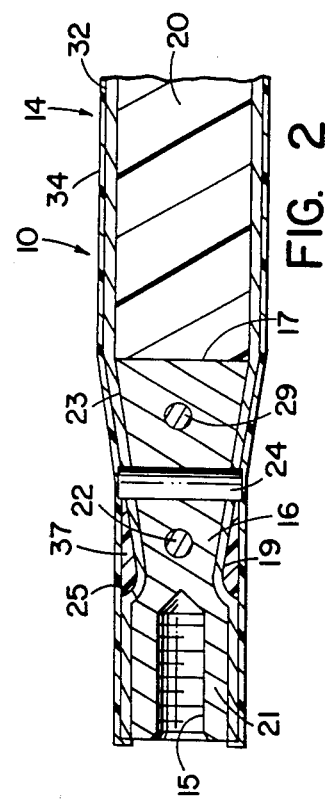
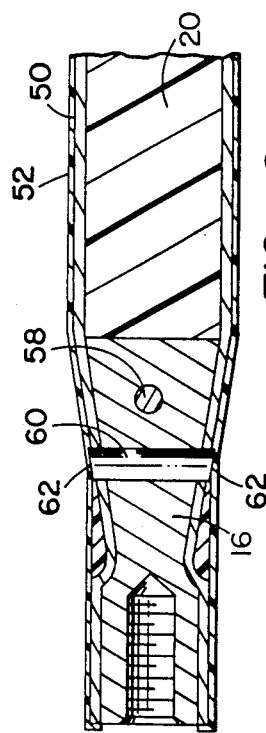
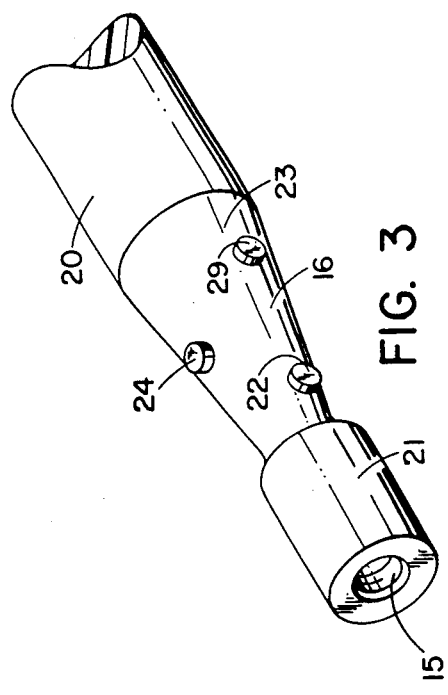

COMPOSITE MATERIAL FORCE OR MOTION TRANSMITTING MEMBER

BACKGROUND OF THE INVENTION

The invention relates generally to motion or force transmitting members such as push-pull and/or torsion rods, and deals more particularly with such a member made of a body of composite material and metal end fittings and having an improved form of connection between the body and each end fitting, the member being strong yet relatively light-weight.

Light-weight force and motion transmitting members of the type with which this invention is concerned are often used in aircraft as the weight of aircraft components is of great importance. For example, such members in the form of push-pull rods can be used to secure and adjust the pitches of helicopter blades as in Pertusio U.S. Pat. No. 3,129,766. This type of push-pull rod typically terminates at each end with a bearing which mates via a pin to an adjacent part so that the rod and adjacent part can pivot relative to one another as motions are transmitted from one to the other.

In addition to being light-weight, composite material rods in the broad class of the invention typically have a synthetic shaft and can be outfitted with corrosion resistant end fittings to make the rod durable.

A light-weight, composite material propeller shaft is disclosed in U.S. Pat. Nos. 3,553,978 and 3,592,884 to Williams and consists of a light-weight and relatively low strength core, end fittings attached to either end of the core, and a stiff tubular composite strength member completely surrounding the core and partially overlapping and adhering to the end fittings to form a rigid connection between the end fittings and the strength member. The strength member consists of a fibrous braid impregnated with a resin which serves to rigidify itself and the braid and to fix the resulting strength member to the end fittings. The core is made of a light material such as foamed polyurethane and serves primarily as an armature for receiving the braid and resin and holding the end fitting in place while the braid and resin are applied and cured. The portion of each end fitting which receives the composite strength member is cylindrical in shape and is either roughened by knurling or longitudinal grooves so that the strength member readily adheres to the end fittings.

U.S. Pat. Nos. 3,263,519 and 3,434,501 to Conrad describe the construction of flexible, motion transmitting cables each having a flexible conduit, wires within the conduit, and fittings at both ends of the conduit. The end fittings overlap the conduits and the conduits have irregularities such as grooves or flanges, and the end fittings are molded so that they interlock with the irregularities of the conduit.

Although light-weight push-pull or torsion rods have been proposed, further advances are deemed necessary to make such rods even stronger.

Accordingly, a general object of the invention is to provide such a rod which is stiff, light-weight, and strong, and has a fitting at either end or both ends to interconnect with other parts and transmit torsion, tension or compression forces between said other parts.

It is a more specific object of the invention to provide, in a stiff push-pull or torsion rod having an end fitting and a light-weight tubular shaft, means for anchoring the tubular shaft to the end fitting to yield a strong bond which resists torsion, compression, and tension forces so that the rod can transmit such forces from one end of the rod to the other without the end fitting breaking loose from or moving relative to the shaft.

Another object of the invention is to provide a specially shaped end fitting with conical and flared portions around which a stiff, tubular shaft fits snugly and interacts with the end fitting to yield a strong bond between the end fitting and tubular shaft withstanding tension and compression forces.

SUMMARY OF THE INVENTION

The push-pull and/or torsion rod of the preferred embodiment of the invention includes a fitting on at least one end of the rod, discrete protrusions extending outwardly from the end fitting, and a stiff strength member which includes a layer of braided strands. The strength member overlaps a portion of the end fitting, and the strands in the braid closely capture the protrusions to anchor the tubular strength member to the end fitting and make a bond which resists tension, compression, and torsion forces.

Also, in one embodiment, the end fitting is conically tapered from the side of the end fitting facing inward of the rod and then flares out from the tip of the cone. The strength member fits tightly around the conical portion and the flared portion of the fitting so that the strength member grips it and thereby transmits tension and compression forces between itself and the fitting.

BRIEF DESCRIPTION OF THE DRAWINGS

FIG. 1 is an elevational plan view of a rod of the invention, and bearings attached to either end of the rod shown in broken line.

FIG. 2 is a sectional view of one end portion of the rod of FIG. 1 along the plane I—I.

FIG. 3 is a perspective view of inner parts of the section of the rod shown in FIG. 2.

FIG. 6 shows a sectional view of another rod embodying the invention.

DETAILED DESCRIPTION OF THE PREFERRED EMBODIMENT

Figure 5:
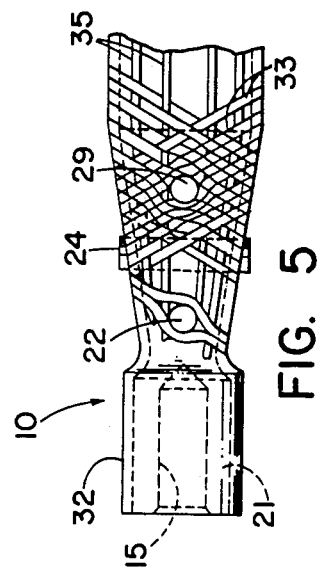
FIG. 5 shows an elevational plan view of a braid surrounding said inner parts of FIG. 3.

As shown in FIGS. 1–5, a preferred embodiment of the invention is a rod generally designated 10 which includes a light-weight cylindrical core 20, end fittings 16, 16 attached to either end of the core and a tubular strength member 14 surrounding the core and much of each end fitting. Each end fitting has three radial bores receiving outwardly protruding pins 22, 24, and 29. The strength member comprises a layer of braided strands 32 impregnated with a resin, and the braids of the strength member closely pass around and capture the pin protrusions to provide a strong bond between the strength member and the end fittings.

As shown by the broken lines of FIG. 1, simple bearings 18, 18 may be connected to either end of the rod 10 so that the rod can mate with other parts via a transverse pin to permit relative, pivotal movement, and each end fitting is provided with a threaded opening 15, as shown in FIG. 2, for receiving such bearing. However, if the rod is needed for another type of application other suitable connectors, such as a socket for a ball or vice versa, or a standard bolt, can be connected to either end of the rod 10 instead of the bearings 18, 18.

FIG. 2 shows a fragmentary sectional view of one end portion of the rod, the other end portion not shown being a mirror image, which end portion includes part of core 20 and the associated metal end fitting 16. The core 20 consists of a light-weight, relatively stiff material such as Styrofoam, foamed polyurethane, or other foamed or unfoamed plastic, and can be formed and attached to the end fitting 16 in a number of ways.

In the illustrated mode of attachment the core and the end fittings are independently manufactured and shaped so that they can be made to abut one another at flat or interlocking surfaces and then be glued together. Regardless of the way the end fittings are attached to the core, the bonds between the core and the end fittings need not be very strong and must only withstand slight stresses associated with the application of the braid and resins. The tubular strength member 14 provides substantially all the strength of the rod once the rod is completely constructed.

The constitution or mode of construction of the core 20 is not central to the present invention and the core, if desired, may be cylindrically hollow and may be removed if possible once the braid is woven upon it and rigidified. For example, the core may be made of a material that melts at a relatively low temperature above room temperature and one or both of the end fittings may include a small axial through hole to allow the core to be removed by heating the rod after the strength member 14 is cured to melt the material of the core and allow it to escape from the rod by flowing as a liquid through one of the through holes. As another possibility the core might be formed by a mandrel, perhaps a collapsible one, which is removed after the strength member is cured. The use of such a mandrel may be particularly practical in the case of a rod having an end fitting at only one end.

Each end fitting 16 has a portion 23 which conically tapers from its core side 17 until it reaches a neck 19 and then it has another portion 25 which flares outwardly from its neck to a cylindrical outer end portion 21. The outer end portion contains the threaded opening 15 for threadably receiving its associated connector such as its bearing 18 of FIG. 1. Generally the end fitting is made of ordinary steel but if the rod will be used in a corrosive environment, the end fittings can be made of stainless steel, aluminum, hard plastic, or other corrosion resistant material. Similarly, a resin and braid fiber material which can withstand the operating environment should be chosen for the strength member.

FIG. 3 shows a fragmentary perspective view of the core 20, an end fitting 16, and retaining pins 22, 24, and 29 and shows how the pins protrude from the end fitting prior to the application of the strength member 14. The pins 22, 24, and 29 are received in the tapered portion 23 of each end fitting 16. It should be understood however that three pins for each end fitting have been shown by way of illustration only. If greater strength between the strength member and the end fitting is desired four or more pins may be used for each end fitting, and in other cases only one or two pins may be sufficient.

As mentioned, the strength member surrounds the core 20, most of each end fitting 16, and the protruding portions of the pins 22, 24 and 29 of each end fitting, and it includes an inner layer of braided strands 32 impregnated with resin and an outer layer or finish coat of resin 34. Contrary to what may be implied from its somewhat schematic illustration of FIG. 1, there is usually not a definite demarcation between the resin impregnating the braid 32 and that of the outer resin layer 34, and if desired both the resin which impregnates the braid and that which coats it can sometimes be applied in one step. The strands or fibers 33, 33 of the braid 32 can be made of Fiberglas, boron, graphite, Kevlar, nylon, cotton, flax or other suitable fibers, and for extra tensile strength, the strength member can also include longitudinal strands or fibers, indicated at 35, 35, woven into the braid.

The strands 33, 33 of the braid, as well as its longitudinal strands 35, 35, if any, pass around and closely capture the protruding portions of the pins 22, 24, and 29 so that the pins anchor the braid to the end fitting 16 and will not easily, after the completion of the strength member, allow the strength member to slip relative to its end fitting when the rod 10 is exposed to tensile, compressional or torsional forces. To make a good anchor, the pins 22, 24, and 29 should protrude into the thickness of the braid. Preferably this protrusion is such that the pins extend at least halfway into the thickness of the braid, and most desirably, as shown in the figures, the pins extend entirely through the thickness of the braided layer to its outer surface.

Figure 4:
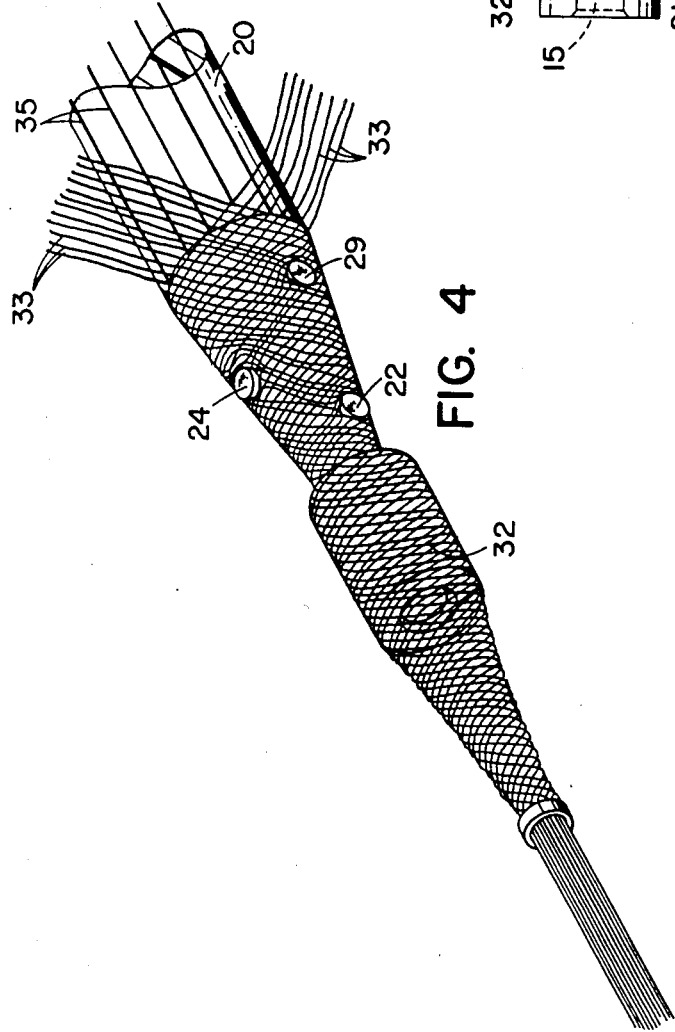
FIG. 4 diagramatically shows a braid being woven onto said inner parts of FIG. 3.

FIG. 4 shows diagramatically how the strands 33, 33 of braid 32, and its longitudinal strands 35, 35 form around the pins 22, 24, and 29 as the braid is woven onto one end fitting 16. Any one of various well known braiding techniques, such as described in U.S. Pat. Nos. 3,552,884 and 3,553,978 to Williams, can be utilized in performing the braiding required for the present invention. As described in the Williams patents, spools of fiber are arranged on at least one ring around a mandrel and leads of the fibers are brought into engagement with a mandrel. The mandrel is then pushed gradually through the ring and, by appropriate motion of the spools on the ring, the spools deliver their fibers to the mandrel in a braided fashion. In the present case the core 20 with attached end fittings 16, 16 would serve as the mandrel.

After the braid 32 is woven onto the end fittings and the core, the ends of the braid are cut approximately to size. Then the braid is soaked in, or otherwise has applied to it, a resin which coats and penetrates the braid, and the resin is then cured, usually by heat treatment. Thus, the braid is hardened and rigidified to at least preliminarily form the strength member of the rod 10. Many different resins may be used depending on the requirements of the rod 10, thermoset resins such as phenolic, epoxy, polyimide, or polyester as well as thermoplastic polysulfones and poly(amide-imide) to name a few. After this first application of resin more resin may be applied to further stiffen the strength member and to give it a smoother finished appearance, such further resin being the aforementioned coat 34. In addition to stiffening the braid, the resin also adheres the strength member to each end fitting and in so doing provides some additional resistance to relative movement between the strength member and its end fittings.

The strength member 14 also has a third type of bond to the end fitting 16 besides the pin anchor and adhesion bonds described above. This third type of bond results from the shape of the end fitting, the stiffness of the strength member 14, and the fact that the strength member fits snugly around the tapered portion 23 and the flared portion 25 of each end fitting 16. When the rod 10 is subjected to a tensile force the strength member 14 abuts the tapered portion 23 of each end fitting 16 to resist the tension, and when the rod is subjected to a compression force the strength member 14 bears against the flared portion 25 of end fitting 16 to resist the compression.

To provide a smooth cylindrical shape to each end of the rod 10 an additional ring 37 of resin or plastic or other material is applied as a filler around the neck portion 19 of each end fitting between the braided layer 32 and the outer layer 34 of resin. Also, to avoid any bumpiness associated with the pins 22, 24, and 29, the pins preferably are of such size as to not protrude significantly beyond the braided layer and so as to be covered by the outer layer 34 of resin.

In another embodiment of the invention, shown in FIG. 6, retaining pins 58 and 60 have slanted end surfaces 62, 62 generally parallel to the surface of the conical portion 23 of the associated end fitting. In this embodiment, the retaining pins protrude evenly to the outer surface of the fibrous braid layer 50 so that a thin layer 52 of resin can cover them while they still serve as very good anchors. This slanting of the pin end surfaces can be accomplished by appropriate grinding of the pins either before or after they are installed in the end fittings.

Figure 7:
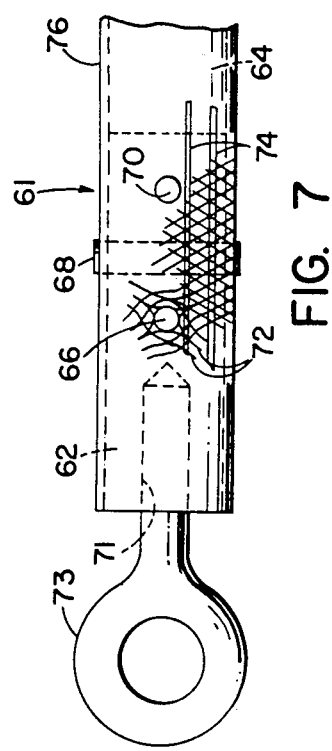
FIG. 7 shows an elevational plan view of one end portion of still another rod embodying the invention except that FIG. 7 does not show a resin which ultimately impregnates and coats a braided layer shown.

FIG. 7 shows a view of one end portion of a push-pull and/or torsion rod generally designated 61 constructed in accordance with another embodiment of the invention, the end portion not shown being a mirror image. The end portion shown includes a cylindrical end fitting 62 and part of a core 64. The end fitting 62 has three radial bores which receive outwardly protruding pins 66, 68, and 70, and a threaded opening 71 for threadably receiving a suitable connector such as a simple bearing 73.

The rod 61 also includes a tubular strength member 76 comprised of braided strands 72, 72 and longitudinal strands 74, 74, which are shown in FIG. 7 and which pass around and capture protruding portions of the pins 66, 68 and 70 to anchor the strength member to the end fitting 62. The strength member also, as in the rod 10, includes a resin in which the strands 72, 72, 74, 74 are embedded and which may include a finish layer or layers over the strands, although the resin is not shown in FIG. 7.

The core 64, strands 72, 72, 74, 74, resin, and end fitting 62 may be made of the same materials utlized for the corresponding parts of the rod 10, and the connection between the core 64 and the end fitting 62 may be made in the same manner as in the rod 10.

Figure 8:
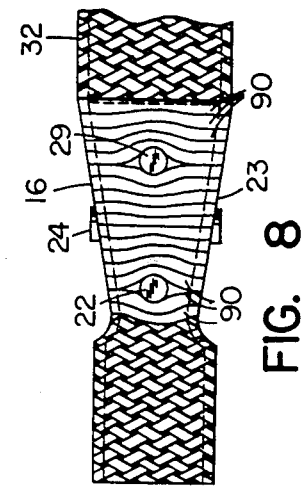
FIG. 8 shows a schematic, elevational plan view of a braid and wrapped strands surrounding inner parts of the section of the rod shown in FIG. 2.

FIG. 8 shows strands 90,90 which have been "spot wrapped" either by hand or machine over the braid 32, before a resin is applied, around the protruding tips of the pins 22, 24, and 29 and generally circularly around the tapered portion 23 of the end fitting 16. The strands 90,90 may comprise any of the aforedescribed fibers suitable for the braid 32 and be, although not necessarily so, of similar cross-sectional size to that of the fibers of the braid 32. They are optionally included in the rod 10 to improve the bond between the strength member 14 and the pins and between the strength member and the end fitting 16. Although not shown in its drawings, these strands 90, 90 may also be wound so as to serve in place of the ring 37 for filling in the neck portion 19 of each end fitting. Similarly, as an optional addition to the rod 61, other strands may be spot wrapped over the braided strands 72,72, around the protruding tips of the pins 66, 68, and 70, and generally circularly around the end fitting 62 to improve the bond between the strength member 76 and the pins and between the strength member and the end fitting 62.

By the foregoing push, pull and/or torsion rods have been described embodying the present invention. However, numerous modifications and substitutions may be made without deviating from the scope of the invention. For example, the aforedescribed push, pull and/or torsion rods, if desired, may be constructed with only one end fitting 16 or 62 and their respective pins, the other end of the rod being constructed with some other type of end fitting or means for attaching it to another part. Furthermore, the strength member of a rod embodying the present invention, if desired, need not always be of a circular cross-section and instead may be constructed to have a non-circular section such as, for example, a triangular, rectangular or oval one. To construct such a non-circular cross-sectioned strength member, a core having a conforming non-circular cross-section, and one or two end fittings having a conforming non-circular cross-section, may be utilized in generally the same manner as described above for the parts of circular cross-section.

We claim:

1. In a force-transmitting rod the combination comprising:

an end fitting having an outer end face defining the associated end of said rod and an inner end face spaced axially inwardly of said outer end face and defining the inner limit of said end fitting, said end fitting further including a tapered portion extending from said inner end face such that the diameter of said end fitting diminishes in proceeding from said inner end face toward said outer end face along said tapered portion, a stiff, generally tubular strength member having a main portion extending along a substantial portion of its length and of substantially constant outside diameter, said strength member also having an end portion adjacent said main portion which end portion surrounds a part of said end fitting including said tapered portion, said end portion of said tubular member having throughout its length a diameter less than said outside diameter of said main portion of said tubular member, said tubular member including a layer of braided strands embedded in a cured resin, and at least one discrete protuberance extending from the surface of said tapered portion of said end fitting and passing at least partially through the thickness of said braided layer to anchor said strength member to said end fitting, said end portion of said tubular strength member also including a layer of strands wrapped generally circularly around said braided layer along at least a part of the length of said tapered portion of said end fitting, said layer of circularly wrapped strands being also embedded in said cured resin.

2. A composite, force-transmitting rod comprising:

an end fitting having an outer end face defining an associated end of said rod and an inner end face spaced axially inwardly of said outer end face and defining the inner limit of said end fitting, said end fitting having a tapered portion which tapers from said inner end face such that the diameter of said end fitting diminishes in proceeding from said inner end face toward said outer end face along said tapered portion, and a strength member having a main portion exteind along a substantial portion of its length and of substantially constant outside diameter, said strength member also having an end portion adjacent said main portion which end portion includes a layer of braided strands embedded in a cured resin, said braided layer surrounding at least a part of said tapered portion of said end fitting and fitting snugly around said tapered portion so that when a rod is subjected to a longitudinal, tensile force said end portion of said strength member abuts said tapered portion of said end fitting to help prevent said strength member from separating from said end fitting, said end portion of said tubular strength member also including a layer of strands wrapped generally circularly around said braided layer along said tapered portion of said end fitting, said layer of circularly wrapped strands being also embedded in said cured resin and said end portion of said strength member along its entire length having an outside diameter less than said outside diameter of said main portion.

3. A force-transmitting rod comprising:

a light weight cylindrical core, a metal end fitting at one end of the core having an outer end face defining an associated end of said rod and an inner end face spaced axially inwardly of said outer end face and defining the inner limit of said end fitting, said end fitting fruther having a tapered portion extending from said inner end face such that the diameter of said tapered portion diminished in proceeding from said inner end face toward said outer end face, a plurality of discrete protuberances extending from said tapered portion of said end fitting, and a stiff strength member having a main portion extending along a substantial portion of its length and of substantially constant outside diameter, said strength member having an end portion adjacent said main portion which end portion includes a layer of braided strands which surrounds at least a part of said tapered portion and said discrete protuberances, said discrete protuberances penetrating at least half way through the thickness of said braided layer said strength member also including a layer of strands wrapped generally circularly around said braided layer along said tapered portion of said end fitting, and both said layer of braided strands and said layer of circularly wrapped strands being embedded in a cured resin, and said end portion of said strength member along its entire length having an outside diameter less than said outside diameter of said main portion.

4. The force-transmitting rod defined in claim 3 wherein said end fitting flares out from the narrow end of said tapered portion and forms a substantially cylindrical portion, said cylindrical portion having a threaded bore for receiving a screw thread.

5. The force transmitting rod defined in claim 4 wherein the diameter of said cylindrical portion of said end fitting is less than said outside diameter of said main portion of said strength member.

6. The force transmitting rod defined in claim 3 wherein the length of said tapered portion of said end fitting is greater than the diameter of said inner end face of said end fitting.

* * * * *